United States Patent [19]

Katerberg et al.

[11] Patent Number: 4,614,948

[45] Date of Patent: Sep. 30, 1986

[54] INK CIRCULATION SYSTEM FOR CONTINUOUS INK JET PRINTING APPARATUS

[75] Inventors: James A. Katerberg, Kettering; Evan L. Craig, Huber Heights; David A. Huliba, Centerville, all of Ohio

[73] Assignee: Eastman Kodak Company, Rochester, N.Y.

[21] Appl. No.: 722,550

[22] Filed: Apr. 12, 1985

[51] Int. Cl.[4] .......... G01D 15/18

[52] U.S. Cl. .......... 346/75; 346/140 R

[58] Field of Search .......... 346/75, 140 R

[56] References Cited

U.S. PATENT DOCUMENTS

| | | | |
|---|---|---|---|
| 4,122,457 | 10/1978 | Erikson et al. | 346/75 |
| 4,320,407 | 3/1982 | Goldis et al. | 346/140 R |
| 4,340,896 | 7/1982 | Cruz-Uribe et al. | 346/140 R |
| 4,399,446 | 8/1983 | McCann et al. | 346/140 R |
| 4,413,267 | 11/1983 | Hein | 346/75 |
| 4,460,904 | 7/1984 | Oszczakiewicz et al. | 346/75 |
| 4,494,124 | 1/1985 | Piatt et al. | 346/1.1 X |

*Primary Examiner*—E. A. Goldberg
*Assistant Examiner*—Gerald E. Preston
*Attorney, Agent, or Firm*—John D. Husser

[57] ABSTRACT

In a continuous ink jet printing apparatus, an ink circulating system allows maintenance of the ink supply reservoir at approximately atmospheric pressure while providing for positive withdrawal of ink from the catcher and/or print head outlet of the apparatus. The system is operable with a single pump. To achieve such positive withdrawal of ink, elements are provided in a bypass line extending from the supply pump outlet to the atmospheric region of the ink reservoir or in the passage from that region of the ink reservoir to the pump intake line, for generating a region(s) of sub-atmospheric pressure, and such region(s) are coupled to the catcher and/or print head outlet.

27 Claims, 4 Drawing Figures

INK CIRCULATION SYSTEM FOR CONTINUOUS INK JET PRINTING APPARATUS

BACKGROUND OF THE INVENTION

1. Field of the Invention

The present invention relates to ink jet printing apparatus of the continuous type and more specifically to simplified ink circulation systems that supply ink to, and return ink from, the printing station of such apparatus.

2. Description of the Prior Art

In "continuous" ink jet printing apparatus streams of uniformly spaced ink drops are created by imposing periodic perturbations on liquid ink filaments issuing from an orifice plate. The filaments are formed by supplying ink under pressure to a print head cavity that is in communication with the orifice plate. Information is imparted to the droplet streams by selective non-charging or charging and deflection of droplets. A portion of the droplets pass to the recording medium but there are a substantial number of non-printing droplets which are intercepted by a catcher for recirculation. It is often desirable that the print head cavity have an outlet other than the orifice plate (e.g. to facilitate dynamic pressure control within the cavity at start-up), and, in these embodiments, efficient circulation of ink flow from such print head outlet should be accommodated.

Ink drop uniformity requires maintaining a uniform pressure in the print head cavity and this is one primary concern in an ink circulation system. However, it is also very important that unused ink be circulated reliably. For example, if ink intercepted by the catcher is not reliably withdrawn and circulated, an accumulation of ink in the catcher region can impede the path of printing drops and/or cause ink-drip from the catcher onto the print medium.

In view of the above and other considerations, prior art approaches for ink circulation in continuous ink jet printing apparatus have been fairly complex. A typical approach is to utilize a supply pump, under the control of a pressure or flow rate feedback system, to assure proper dynamic print head pressure and a separate pump for maintaining a vacuum in the ink supply reservoir to return ink (e.g. from the catcher or print head outlet).

There are disadvantages connected with the use of such a vacuum pump return system. First, the vacuum pump's continual withdrawal of air from the supply reservoir can cause undesired changes in ink viscosity. Also, the use of separate supply and withdrawal pumps adds cost and complexity to the ink jet printing apparatus, and to its size and energy usage.

SUMMARY OF THE INVENTION

One significant object of the present invention is to overcome the disadvantages of prior art ink circulation systems such as noted above and to provide simplified systems for effecting ink supply and return in ink jet printing apparatus of the continuous type. One advantageous feature of the invention is that such ink circulation can be effected with a single pump. Another important feature of the present invention is its employment of an ink supply reservoir that operates at approximately atmospheric pressure.

In one aspect the present invention attains the above and other objectives and advantages by providing for ink jet printing apparatus of the type having a print head for producing a continuous stream(s) of ink droplets and a catcher for unused ink droplets, an improved ink circulating system that includes an ink supply reservoir, means for venting the supply reservoir to substantially atmospheric pressure, an ink supply pump, means for generating a sub-atmospheric pressure region(s) in the circulating system at a location(s) isolated from the supply reservoir, and ink return means for providing an ink passage(s) from the catcher and/or a print head outlet to such reduced pressure region(s). In one particularly preferred embodiment the generating means comprises venturi means which receives a portion of the flow from the ink supply pump. In another preferred embodiment the generating means comprises a restrictor constructed and located to limit flow from the supply reservoir below the supply pump's displacement rate.

BRIEF DESCRIPTION OF THE DRAWINGS

The subsequent description of preferred embodiments of the invention refers to the attached drawings wherein.

DETAILED DESCRIPTION OF THE PREFERRED EMBODIMENTS

Figure 1:
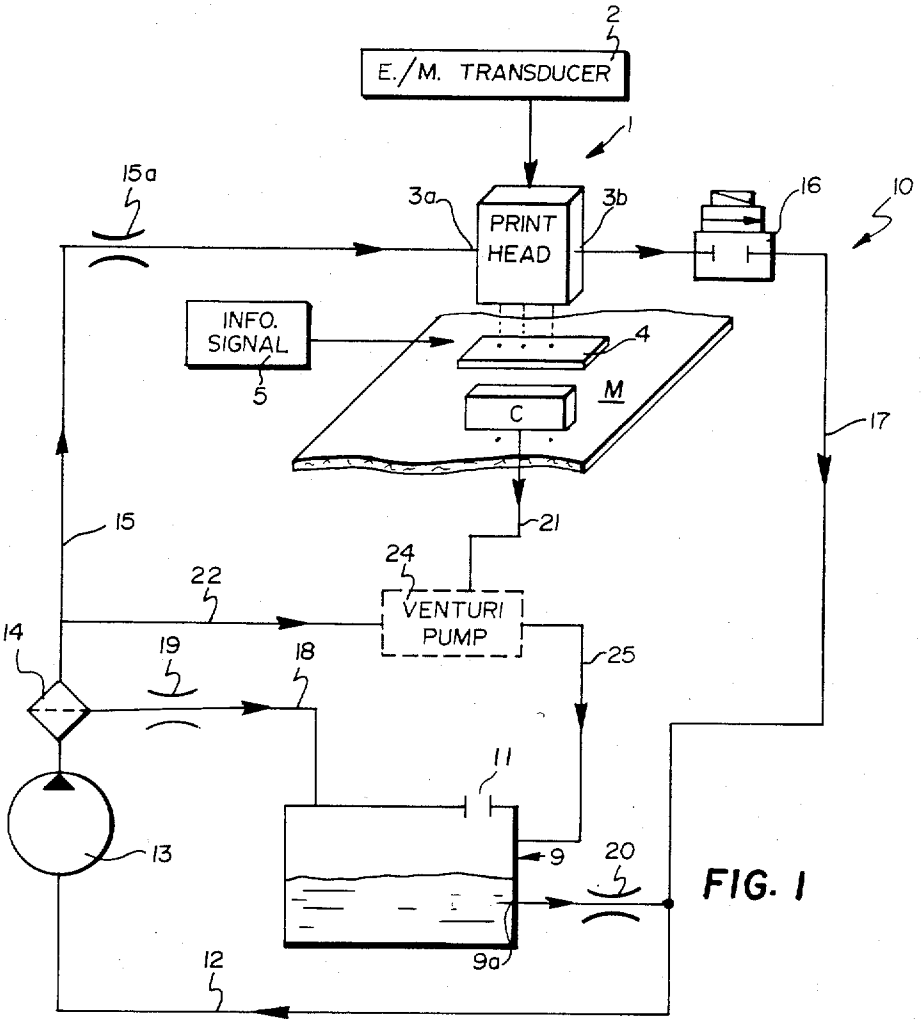
FIG. 1 is a schematic illustration of a continuous ink jet printing apparatus incorporating one preferred embodiment of ink circulation system in accord with the present invention.

The continuous ink jet printing apparatus 10 illustrated in FIG. 1 comprises a print head 1 that includes an ink cavity portion with an ink inlet *3a* and a ink outlet *3b*. The ink cavity portion communicates with an orifice plate portion that is vibrated by an electromechanical transducer 2. When pressurized ink is supplied to the orifice plate via the ink cavity portion, ink filaments issue from the orifices of the plate. These ink filaments break into droplets at a location opposite a charge plate 4, which receives discrete signals relative to the charging or non-charging of each droplet from an information signal source 5. In one mode of operation droplets, which are charged by charge plate 4 are deflected to a catcher assembly "C" and uncharged droplets pass on to print upon a receiving medium M, e.g. plain paper.

The printer portions thus far described are conventional and are merely representative of the various alternative constructions with which the present invention is useful. One preferred kind of construction for the print head body and transducer is disclosed in U.S. application Ser. No. 390,105, entitled "Fluid Jet Print Head" and filed June 21, 1982, now continuation-in-part, Ser. No. 06/777,102, filed Sept. 17,1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful. Exemplary preferred charge plate constructions are disclosed in U.S. application Ser. No. 517,608, entitled "Molded Charge Electrode Structure" and filed July 27, 1983, now abondoned, further filed as continuation-in-part, Ser. No. 06/696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Thus, the subsequently described ink circulation system of the present invention is useful with a variety of ink jet printing apparatus of the kind that employ a "continuous flow" of ink droplets (e.g. in contrast to drop-on-demand printers).

In general, the ink circulation system of the FIG. 1 embodiment comprises an ink supply reservoir 9 from which ink is supplied to an intake conduit 12 for ink supply pump 13. A portion of the ink output from pump 13 passes, under positive pressure, through a filter 14 and print head supply conduit means 15 to the print head inlet *3a*. Air that is entrapped in the ink is captured by filter 14 and returned to reservoir 9 via conduit 18, which is limited as to ink flow rate, e.g., by means of a flow restrictor 19.

The print head outlet *3b* is coupled to a return conduit 17, which includes a solenoid valve 16. In start-up modes of operation solenoid valve 16 is opened so ink can cross-flow freely through the print head cavity into a print head return conduit means 17. A flow restrictor 15*a* can be provided in supply conduit 15 to balance the pressure of ink in the cavity during such cross-flow mode, e.g., so that air is not ingested into print head nor ink allowed to drip from the print head. In the printing mode of operation the valve 16 is at least partially closed so that ink filaments issue from the print head orifice plate as described above. During printing operation, a portion of the ink is used in printing on medium M, but a significant portion of the ink projected from the print head orifice plate passes into catcher C.

In accord with the present invention the ink reservoir 9 has a construction wherein a volume of ink is contained at approximately atmospheric pressure, e.g. by providing an ink supply region that is vented to the atmosphere as illustrated by vent means 11. To effect ink return in conjunction with such a vented ink supply region, the present invention provides means, utilizing the dynamic ink flow of the printing apparatus, for generating a sub-atmospheric pressure at a location isolated from the vented ink supply region. FIG. 1 illustrates an embodiment of this approach wherein different means are provided to generate the sub-atmospheric pressure regions respectively for the catcher and head outlet return lines.

Figure 2:
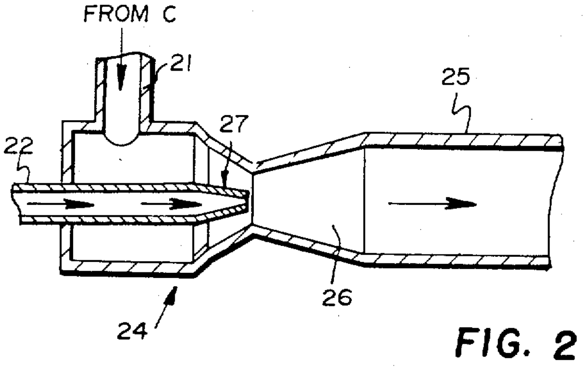
FIG. 2 is an enlarged cross-sectional view showing one preferred venturi pump configuration useful in accord with the present invention.

Thus, referring to FIG. 1 and also FIG. 2, it can be seen that the ink circulation system includes a bypass conduit 22 which directs a portion of the output from ink supply pump 13, through venturi pump means 24, back into reservoir 9 via conduit 25. The venturi pump means can take various forms of commercially available vacuum jet pumps. One preferred construction is shown in FIG. 2, wherein ink from bypass conduit 22 is introduced into the venturi restriction inlet. This ink passes through the venturi restriction region and is introduced into mixing chamber 26, through nozzle 27, to produce the pumping effect. That is, as the ink passes through the nozzle restriction it undergoes an increase in velocity and decrease in pressure and these changes produce a reduced pressure region (e.g. region of sub-atmospheric pressure) in chamber 26. The reduced pressure in this region is isolated from the atmospheric ink supply region and withdraws ink from the catcher C along return conduit 21. The ink and air withdrawn from the catcher combine with the ink flow from bypass conduit 22 and are returned to the reservoir in conduit 25.

It is highly preferred that the circulation system be designed so that ink flows through the bypass line 22 at a greater rate than the rate of ink flow through the head supply conduit 15. First, the larger bypass line flow rate enables the venturi pump means to be highly effective in providing the motive force for return of ink through line 21 from the catcher C. Second, the larger bypass line flow rate enhances the cleanliness of ink in the circulation system by repetitious passage through the filter 14. It is desirable that the bypass line flow rate be at least twice the flow rate in print head supply line 15 during the printing condition of the circulation system. Most preferably the bypass flow rate is three or more times the printing flow rate in line 15.

Figure 3:
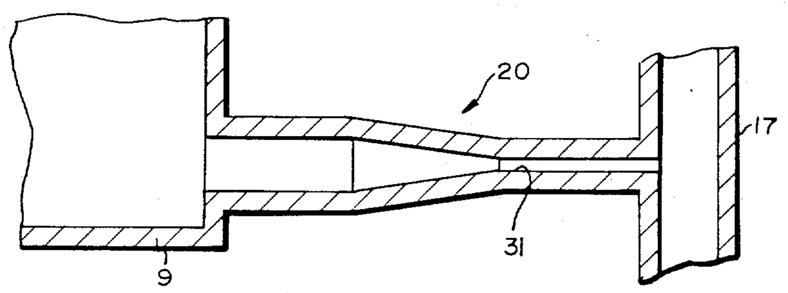
FIG. 3 is an enlarged cross-sectional view showing one flow restriction configuration useful in accord with the present invention.

Referring now to FIG. 3, as well as FIG. 1, another means for generating a reduced pressure region, e.g. a sub-atmospheric region, is illustrated as it is employed to create pressure differential that withdraws ink from the print head outlet. As previously noted, during start-up operations valve 16 is opened to allow ink to cross-flush through the print head. In order that ink not pass through the printing orifices at this stage, it is desirable that the print head return conduit be coupled to a sub-atmospheric pressure region. To allow the ink reservoir to be at generally atmospheric pressure and to avoid use of a separate vacuum pump, a flow restriction means 20 is provided at a location that isolates the pump inlet line 12 and the print head return line 17 from the atmospheric pressure in the ink reservoir 9. That is, the reduced pressure region is generated at a location isolated from the atmospheric region of the reservoir 9.

As shown in FIG. 3, one embodiment for implementing this function is to provide for a restriction 31, in the ink passage from the ink supply reservoir 9, that limits the rate of ink flow from the reservoir below the ink displacement rate of pump 13. The return conduit 17 is coupled to the pump intake line 12 at a location downstream of restriction 31 and the reduced pressure in the pump intake line 12, induced by the restriction 31, is effective to create the desired sub-atmospheric pressure in the return line 17. The relative sizes of the conduits 12, 17 and 20 are selected in view of the displacement rate of the pump 13 so that the desired pump outlet flow rate can be achieved without pump cavitation and with the desired negative pressure in line 17. If desired, the valve 16 can remain partially open during printing operation to accommodate these objectives in the printing mode, i.e., while printing ink streams are projected from the orifice plate of the print head 1.

A positive displacement pump, such as a gear pump, is preferred for use as the ink supply pump 13 in accord with the present invention; however other pumps such as centrifugal pumps can be useful in practice of the present invention.

Some exemplary operative parameters are illustrative of the desired construction for a circulation system according to the present invention; however, those skilled in the art will appreciate that these are only illustrative of the various parameters that are useful. Thus, in the cross-flow mode, used in start-up or cleaning operation, it is useful to have the relative sizes of the ink supply pump, ink transport conduits, restrictors, valves, etc., of the circulation system be constructed so that the pressure in line 15 up to restrictor 15*a* is about 16 psi, the pressure in the print head cavity is about atmospheric and the vacuum in return line 17 is about 1 or 2 inches of mercury. In the printing mode of operation, e.g. with valve 16 is closed, those parameters can be selected to yield a pressure of about 20 psi upstream of restrictor 15*a*, a pressure in the range of from about 9 to 16 psi (e.g. 10.5 psi) in the print head cavity, a vacuum of about 9 inches of mercury in return line 17 and a pressure in the range of about 6 to 20 inches of water in catcher return line 21.

Figure 4:
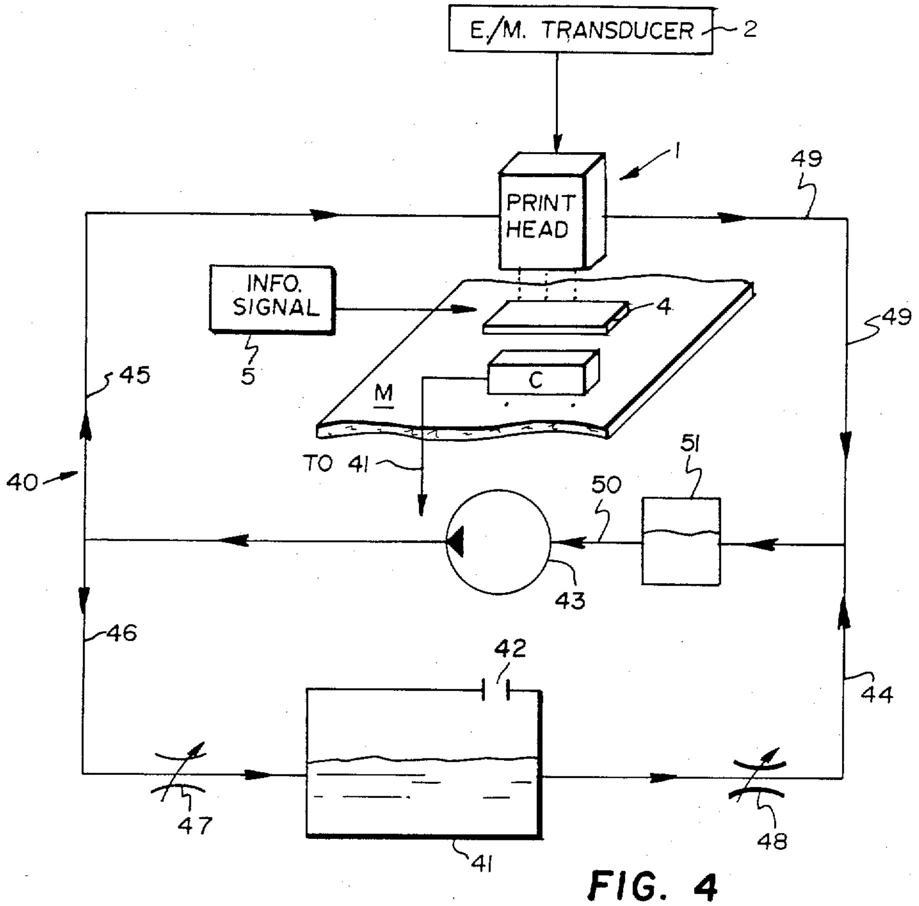
FIG. 4 is a schematic illustration of a continuous ink jet printing apparatus incorporating another preferred ink circulation system embodiment in accord with the present invention.

Turning now to FIG. 4, there is illustrated another continuous ink jet printing apparatus 40 employing an alternative embodiment of the present invention. The print head and its related members, e.g. transducer, charge plate, catcher, etc., can be as described with respect to FIG. 1 and are denoted with corresponding numbers. In the fluid circulation system of the FIG. 4 embodiment, ink discharged by pump 43 is conducted along print head supply conduit means 45 to provide a pressured ink supply in the print head cavity. As illustrated, a portion of the ink discharged from pump 43 is recirculated back to ink supply reservoir 41, which is vented by means 42, via bypass conduit means 46, which includes variable restrictor means 47. Ink pressure in the print head cavity can be varied by adjustment of variable restrictor means 47, as well as by control of the pump 43. The FIG. 4 circulation system can employ a filter(s) at appropriate locations, e.g., in the manner described with respect to FIG. 1.

In accord with the present invention, another variable restrictor means 48 is provided in reservoir supply conduit means 44 to provide a region of reduced (e.g. sub-atmospheric) pressure that is isolated from the atmospheric region of reservoir 41. The print head return conduit means 49 is connected to supply conduit means 44 upstream of an air trap means 51 so that a negative pressure reference is provided to conduit 49 and the print head. An air trap 51 is provided to remove air in the ink prior to passing into pump intake line 50.

As previously described with respect to the FIG. 1 embodiment, the relative flow rates through lines 44 and 49 are selected in accord with the pump displacement rate to obtain the desired pressure levels and ink supply rate, while maintaining the reservoir substantially at atmospheric pressure. The ink from catcher can be returned to reservoir by gravity, by venturi pump means provided in bypass line 46 as described above or by connection to line 49, with an appropriate restrictor in the catcher line. The variable restrictors 47 and 48 can alternatively be fluidic or mechanical pressure regulator valves. If desired, one restrictor could be a fixed restrictor; however, it is highly preferred that at least one of restrictors 47 and 48 be a regulator valve so that regulation of the pressure by pump adjustment does not change the vacuum line condition.

The invention has been described in detail with particular reference to preferred embodiments thereof, but it will be understood that variations and modifications can be effected within the spirit and scope of the invention.

What is claimed is:

1. In continuous ink jet printing apparatus of the type having a print head for producing ink droplets, a droplet catcher and an ink circulation system including an ink supply reservoir, an ink pump and ink conduit means, the improvement wherein:

(a) said ink supply reservoir includes means for venting it to approximately atmospheric pressure; and (b) said ink circulation system includes: (i) means for generating a sub-atmospheric pressure region(s) within said ink conduit means at a location isolated from the atmospheric region of said ink supply reservoir; and (ii) ink return means for providing ink passage(s) from said catcher and/or an outlet of said print head to said sub-atmospheric pressure region(s).

2. The invention defined in claim 1 wherein said generating means comprises means for restricting the rate of ink flow from said ink supply reservoir to said pump inlet below the ink displacement rate of said pump means.

3. The invention defined in claim 1 wherein said generating means comprises bypass conduit means for directing a portion of the ink from said supply pump into said ink supply reservoir without passing to said print head and venturi pump means for receiving a motive flow from said ink bypass conduit means.

4. The invention defined in claim 1 wherein said generating means comprises bypass conduit means for directing a portion of the ink from said supply pump along a path which bypasses said print head and venturi pump means located in said bypass conduit means.

5. The invention defined in claim 1 wherein said generating means comprises venturi means for receiving a portion of the ink flow from said ink supply pump.

6. In continuous ink jet printing appatatus of the type having (i) a print head for receiving ink at a print head inlet and discharging ink through a print head outlet and/or through printing orifice means and (ii) catcher means for catching non-print ink from said orifice means, an improved ink circulation system comprising:

(a) a reservoir constructed to contain a volume of ink within a supply zone that is vented to approximately atmospheric pressure;

(b) a pump, having an inlet that is coupled to said reservoir by pump intake conduit means and an outlet that is coupled to said print head inlet by print head supply conduit means;

(c) bypass conduit means for directing a portion of the ink flow from said pump back to said supply zone, without passing to said print head;

(d) means, located in at least one of said pump intake or said bypass conduit means, for generating a region(s) of sub-atmospheric pressure isolated from the atmospheric region of said reservoir; and (e) return conduit means, for providing a sub-atmospheric passage from said catcher means and/or said print head outlet to said region(s).

7. The invention defined in claim 6 wherein said generating means comprises a venturi construction forming a juncture between said bypass conduit means and the return conduit means from said catcher.

8. The invention defined in claim 6 wherein said generating means is constructed to restrict the rate of ink flow from said reservoir to said pump intake conduit means and wherein said return conduit means couples said print head outlet to the reduced pressure generated by such flow restriction.

9. The invention defined in claim 1, 2, 3, 4, 5, 6, 7 or 8 wherein said apparatus comprises a single pump for effecting ink supply and recirculation.

10. The invention defined in claim 3, 4, 5 or 6 wherein said generating means further comprises means for restricting the rate of ink flow from said ink reservoir to said pump below the ink displacement rate of said pump.

11. The invention defined in claim 10 wherein said return conduit means includes means providing a sub-atmospheric passage from said catcher to said venturi means and a sub-atmospheric passage from said print head outlet to said flow restricting means.

12. The invention defined in claim 2 or 8 wherein said return conduit means includes means providing a sub-atmospheric passage from said catcher and said print head outlet to the reduced pressure generated by such flow restriction.

13. The invention defined in claim 12 wherein said return conduit means includes an air trap located to prevent catcher and/or print head entrapped air from passing to said pump means.

14. The invention defined in claims 3, 4, 6 or 7 wherein said bypass conduit means is constructed to bypass a major portion of the ink from said pump means.

15. The invention defined in claim 14 including filter means located between said reservoir and said bypass conduit.

16. The invention defined in claim 3, 4, 6 or 7 including filter means located between said reservoir and said bypass conduit.

17. In continuous ink jet printing apparatus of the type having a print head for producing ink droplets, a droplet catcher and an ink circulation system including an ink supply reservoir, an ink pump and conduit means for transporting ink, the improvement wherein:

(a) said ink supply reservoir includes means for venting it to approximately atmospheric pressure; and (b) said ink circulation system includes: (i) bypass conduit means for directing a portion of the ink from said ink supply pump into said reservoir without passing to said print head, (ii) venturi pump means for receiving ink flow of said ink bypass conduit means, and (iii) ink return means for providing an ink passage from said catcher to a sub-atmospheric pressure region generated by said venturi pump means.

18. The invention defined in claim 17 wherein said bypass conduit means is constructed to bypass a major portion of the ink from said ink supply pump.

19. The invention defined in claim 17 or 18 including filter means located between said reservoir and said bypass conduit.

20. In continuous ink jet printing apparatus of the type having a print head for receiving ink at a print head inlet and discharging ink through a print head outlet and/or through printing orifice means, an improved ink circulation system comprising:

(a) a reservoir constructed to contain a volume of ink within a supply zone that is vented to approximately atmospheric pressure;

(b) a pump, having an inlet that is coupled to said reservoir by pump intake conduit means and an outlet that is coupled to said print head inlet by print head supply conduit means;

(c) means, located between said reservoir and said pump intake conduit means, for generating a region of sub-atmospheric pressure isolated from the atmospheric region of said reservoir; and (d) return conduit means, for providing a sub-atmospheric passage from said print head outlet to said sub-atmospheric pressure region.

21. The invention defined in claim 20 wherein said return conduit means includes an air trap located to prevent catcher and/or print head entrapped air from passing to said pump means.

22. The invention defined in claim 16 or 20 wherein said apparatus comprises a single pump for effecting ink supply and recirculation.

23. In continuous ink jet printing apparatus of the type having a print head for producing ink droplets, a droplet catcher and an ink circulation system including an ink supply reservoir, an ink supply pump and ink conduit means, the improvement wherein:

(a) said ink supply reservoir includes means for venting it to approximately atmospheric pressure; and (b) said ink circulation system includes: (i) venturi pump means for receiving a portion of the ink flow from said ink supply pump and generating a sub-atmospheric pressure region at a location isolated from the atmospheric region of said ink supply reservoir; and (ii) ink return means for providing an ink passage from said catcher to said sub-atmospheric pressure region.

24. The invention defined in claim 20 wherein said generating means comprises a regulator valve of the mechanical, electro-mechanical or fluidic type.

25. The invention defined in claim 20 wherein said apparatus comprises a droplet catcher and a conduit coupling said catcher to said reservoir and wherein said catcher is located relative to said reservoir for gravity return of ink from said catcher to said reservoir.

26. The invention defined in claim 20 further comprising bypass conduit means for directing a portion of ink flow from said pump outlet to said reservoir and restrictor means located in said bypass conduit means.

27. The invention defined in claim 26 wherein at least one of said generating and restrictor means is a pressure regulator valve.

* * * * *